United States Patent
Abou-Chahine et al.

(10) Patent No.: US 11,328,547 B2
(45) Date of Patent: May 10, 2022

(54) METHOD OF DRIVING A COMPONENT OF A VEHICLE, SYSTEM, COMPUTER PROGRAM PRODUCT AND COMPUTER-READABLE MEDIUM

(71) Applicant: HELLA GMBH & CO. KGAA, Lippstadt (DE)

(72) Inventors: Zeid Abou-Chahine, Lippstadt (DE); Henning Irle, Lippstadt (DE); Frank Schliep, Soest (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 158 days.

(21) Appl. No.: 16/866,180

(22) Filed: May 4, 2020

(65) Prior Publication Data

US 2020/0262390 A1     Aug. 20, 2020

Related U.S. Application Data

(63) Continuation of application No. PCT/EP2017/078234, filed on Nov. 3, 2017.

(51) Int. Cl.
*G07C 9/28* (2020.01)
*G07C 9/00* (2020.01)
(Continued)

(52) U.S. Cl.
CPC ............ *G07C 9/28* (2020.01); *G01C 21/16* (2013.01); *G07C 9/00309* (2013.01);
(Continued)

(58) Field of Classification Search
CPC .. G07C 9/00309; G07C 9/00571; G07C 9/22; G07C 9/28
See application file for complete search history.

(56) References Cited

U.S. PATENT DOCUMENTS 10,136,265 B2 *  11/2018  Lai ........................ H04W 4/40
10,196,037 B2 *  2/2019  Nicholls ................ E05F 15/73
(Continued)

FOREIGN PATENT DOCUMENTS

DE    10 2015 109 468 A1    12/2016
EP         2 672 739 A1     12/2013
(Continued)

*Primary Examiner* — Daniell L Negron
(74) *Attorney, Agent, or Firm* — Muncy, Geissler, Olds & Lowe, P.C.

(57) ABSTRACT

Driving a component of a vehicle by using a portable user identification device for the vehicle and an user identification unit of the vehicle, whereat a controller evaluates an identifying signal sent by a transmitter of the portable user identification device to a receiver of the user identification unit and the controller drives the component of the vehicle according to the evaluation of the identifying signal. In order to provide a higher level of security by driving a component of a vehicle by using a portable user identification device for a vehicle, to a point of time $t_n$ a position of the portable user identification device relative to a position of the portable user identification device to a point of time $t_n = t_f$, to which the portable user identification device is departing from the vehicle, is determined and stored in a memory on a regular basis.

10 Claims, 1 Drawing Sheet

(51) Int. Cl.
*G07C 9/22* (2020.01)
*G01C 21/16* (2006.01)
*B60R 25/24* (2013.01)
*B60R 25/40* (2013.01)

(52) U.S. Cl.
CPC .......... *G07C 9/00571* (2013.01); *G07C 9/22* (2020.01); *B60R 25/24* (2013.01); *B60R 25/406* (2013.01); *G07C 2009/00555* (2013.01); *G07C 2209/63* (2013.01)

(56) References Cited

U.S. PATENT DOCUMENTS

| | | | |
|---|---|---|---|
| 11,188,567 B2* | 11/2021 | Yamashita | G06F 16/285 |
| 2007/0168126 A1 | 7/2007 | Wence et al. | |
| 2010/0075655 A1 | 3/2010 | Howarter et al. | |
| 2016/0236652 A1* | 8/2016 | Miyazawa | B60R 25/24 |
| 2018/0148015 A1 | 5/2018 | Weghaus | |
| 2020/0216025 A1* | 7/2020 | Le Bourgeois | B60R 25/241 |

FOREIGN PATENT DOCUMENTS

| | | |
|---|---|---|
| FR | 2 929 396 A1 | 10/2009 |
| FR | 3 044 421 A1 | 6/2017 |

\* cited by examiner

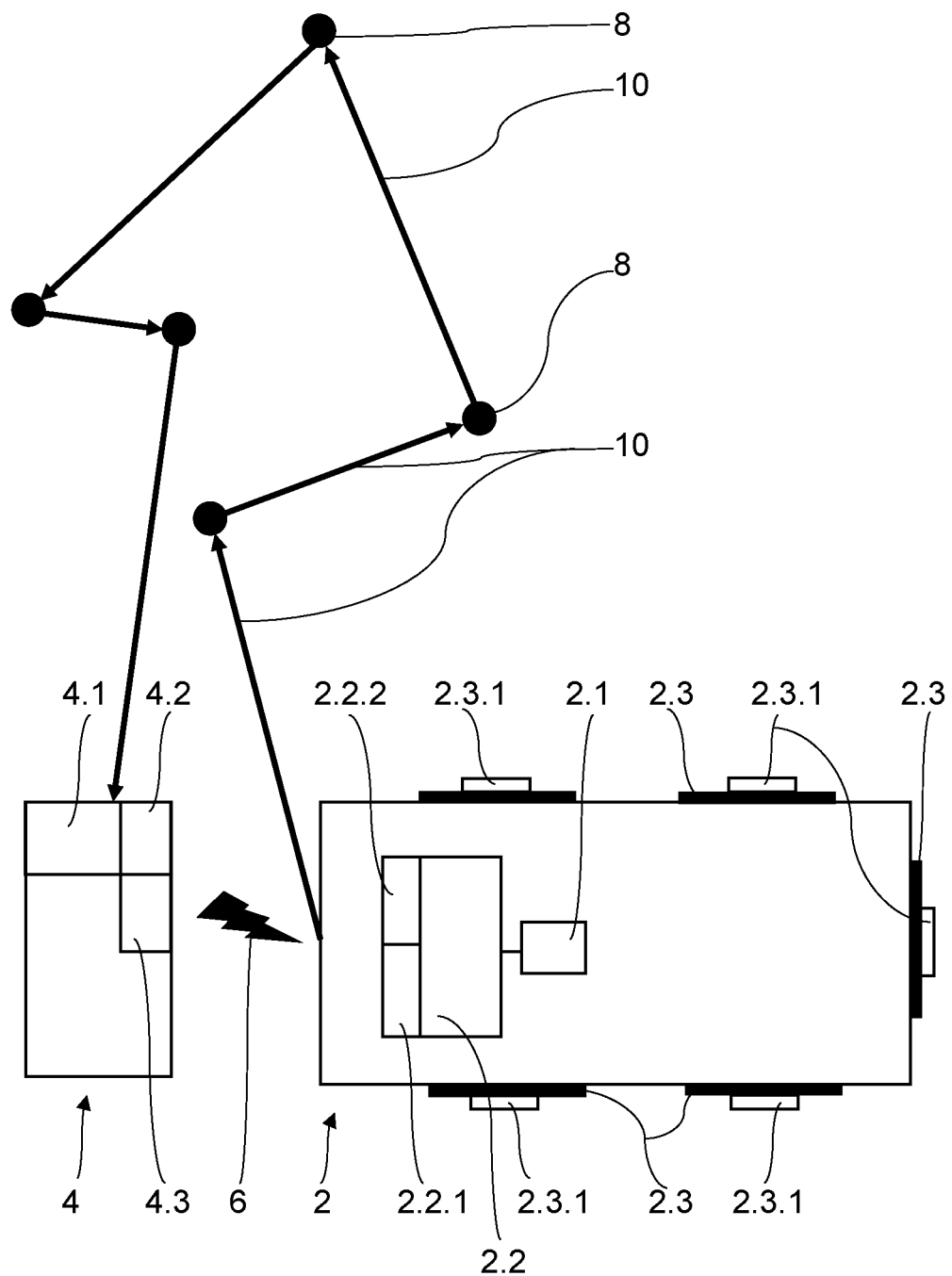

METHOD OF DRIVING A COMPONENT OF A VEHICLE, SYSTEM, COMPUTER PROGRAM PRODUCT AND COMPUTER-READABLE MEDIUM

This nonprovisional application is a continuation of International Application No. PCT/EP2017/078234, which was filed on Nov. 3, 2017 and which is herein incorporated by reference.

BACKGROUND OF THE INVENTION

Field of the Invention

The present invention relates to a method of driving a component of a vehicle by using a portable user identification device for the vehicle and an user identification unit of the vehicle, a system for driving a component of a vehicle by using a portable user identification device for the vehicle and an user identification unit of the vehicle, a computer program product and a computer-readable medium.

Description of the Background Art

Such methods, systems, computer program products and computer-readable media are already well known in different embodiments.

Furthermore, the machine translation of the FR 2 929 396 A1 into the English language discloses a system and a method for locating the position of a vehicle by a user. The known system comprises a portable object intended to be made available to the user, whereat the portable object is equipped with at least one inertial device and means for processing a signal delivered by the inertial device to determine a trajectory followed by the portable object. The known method for implementing the system comprises the following steps: a step of initializing the implementation of the processing means of the portable object as a result of a request of putting in a locking device of vehicle doors of the vehicle, a first step of acquiring a first signal delivered by the inertial device, a first step of processing the first signal to determine a first trajectory, a step of storing the first trajectory, a step of restoring to the user the first trajectory through the implementation of a screen equipping the portable object, a second step of acquiring a second signal delivered by the inertial device, a second step of processing the second signal to determine a second trajectory, a step of implementing means for comparing the first and second trajectories for determining an item of information for retrieving the vehicle.

SUMMARY OF THE INVENTION

It is therefore an object of the present invention to provide a higher level of security by driving a component of a vehicle by using a portable user identification device for a vehicle.

This object is solved by a method of driving a component of a vehicle by using a portable user identification device for the vehicle and an user identification unit of the vehicle, wherein to a point of time $t_n$ by means of the movement sensor of the portable user identification device a position of the portable user identification device relative to a position of the portable user identification device to a point of time $t_n=t_l$, to which the portable user identification device is departing from the vehicle, is determined and stored in the memory on a regular basis, starting with the point of time $t_n=t_l$, whereat a position of the portable user identification device to a point of time $t_n=t_m$, to which the portable user identification device is arriving at the vehicle again is transmitted as the identifying signal by the transmitter of the portable user identification device to the receiver of the user identification unit of the vehicle, a system for driving a component of a vehicle by using a portable user identification device for the vehicle and an user identification unit of the vehicle, a computer program and a computer-readable medium. The point of time $t_n=t_l$ is the first point of time the position of the portable user identification device is determined by the movement sensor and the point of time $t_n=t_m$ is the last point of time the position of the portable user identification device is determined by the movement sensor with respect to each time the method according to the invention is processed. For example, the movement sensor determines a spatial position of the portable user identification device, like a position based on a global coordinate system.

A main advantage of the invention is a higher level of security by driving a component of a vehicle by using a portable user identification device for a vehicle. Because of using the invention, the portable user identification device for the vehicle is determining its position relative to a position of the portable user identification device to a point of time $t_n=t_l$, to which the portable user identification device is departing from the vehicle, independently from other parts of the system or the vehicle, therefore, the driving of a component of a vehicle by using a portable user identification device for a vehicle is more secure against relay station attacks.

Basically, the evaluation of the identifying signal sent by the transmitter of the portable user identification device to the receiver of the user identification unit can be of any useful and applicable manner. Advantageously, the component of the vehicle will be driven by the controller, if the identifying signal substantially correlates to a position of the vehicle to the point of time $t_n=t_m$.

An advantageous development of the aforementioned embodiment is, that the component of the vehicle will be driven by the controller, if the identifying signal correlates with a position, which is within a certain area around the position of the vehicle defined beforehand. That way, some flexibility of the evaluation of the identifying signal is allowed for. For example, if a user, while carrying the portable user identification device, is leaving the vehicle at one vehicle door and approaching the vehicle at another vehicle door.

A further advantageous development of the method according to the invention is, that the user identification unit comprises at least one vehicle sensor for determining an alteration of a position of the vehicle during a period of time starting with the point of time $t_n=t_l$ the portable user identification device is departing from the vehicle until the point of time $t_n=t_m$ the portable user identification device is arriving at the vehicle again, whereat the evaluation of the identifying signal by the controller is executed according to the alteration of the position of the vehicle. Hereby, the method according to the invention can be used in the aforementioned situation, too. For example, such a situation could occur, if more than one users with more than only one portable user identification devices are using the vehicle.

The same is true for an advantageous development of the system according to the invention, where the user identification unit comprises at least one vehicle sensor for determining an alteration of a position of the vehicle during a period of time starting with the point of time $t_n=t_l$ the portable user identification device is departing from the vehicle until the point of time $t_n=t_m$ the portable user identification device is arriving at the vehicle again, whereat the controller is built in such a manner, that the evaluation of the identifying signal by the controller can be executed according to the alteration of the position of the vehicle.

Another advantageous development of the method according to the invention is, that the point of time $t_n=t_l$, to which the portable user identification device is departing from the vehicle, is stored in the memory of the portable user identification device and the controller of the user identification unit of the vehicle, whereat the evaluation of the identifying signal by the controller is executed according to the point of time $t_n=t_l$ stored. That way, the security against relay station attacks or other attacks is further improved.

A further advantageous development of the method according to the invention is, that an operation of the movement sensor of the portable user identification device is started and/or stopped according to an amount of energy available to the portable user identification device to operate the portable user identification device in a low power mode. Hereby, a malfunctioning of basic functions of the portable user identification device because of running out of energy due to the usage of the movement sensor of the portable user identification unit is avoided.

In general, the movement sensor of the system according to the invention can be of any useful and applicable type, design, material, dimension and arrangement. Advantageously, the movement sensor is built as a 9-axes-sensor. A 9-axes-sensor is a sensor, which comprises three acceleration sensors for measuring in x, y, z directions, three gyroscopes for measuring turns around the x, y, z directions and three magnetometers for measuring in the x, y, z directions.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE illustrates an embodiment of a system according to the invention in a partial view.

DETAILED DESCRIPTION

The FIGURE displays an embodiment of a system for driving a component 2.1 of a vehicle 2 by using a portable user identification device 4 for the vehicle 2 and an user identification unit 2.2 of the vehicle 2 according to the invention. The portable user identification device 4 is designed as a key fob and comprises a movement sensor 4.1, a memory 4.2 and a transmitter 4.3. The user identification unit 2.2 of the vehicle 2 comprises a receiver 2.2.1 and a controller 2.2.2, whereat the controller 2.2.2 is built in such a manner, that an identifying signal sent by the transmitter 4.3 of the portable user identification device 4 to the receiver 2.2.1 of the user identification unit 2.2 can be evaluated by the controller 2.2.2 and the component 2.1 of the vehicle 2 can be driven by the controller 2.2.2 according to the evaluation of the identifying signal. The movement sensor 4.1 of the portable user identification device 4 is designed as a 9-axes-sensor, comprising three acceleration sensors for measuring in x, y, z directions, three gyroscopes for measuring turns around the x, y, z directions and three magnetometers for measuring in the x, y, z directions. The component 2.1 of the vehicle 2 is designed as a central locking system of the vehicle 2. The identifying signal sent by the transmitter 4.3 of the portable user identification device 4 to the receiver 2.2.1 of the user identification unit 2.2 is symbolized by an arrow 6.

The function of the system as well as the method according to the FIGURE are explained as follows:

A user of the vehicle 2 is deboarding the vehicle 2 while carrying the portable user identification device 4. The user is not displayed. Because of deboarding the vehicle 2, the portable user identification device 4 is departing from the vehicle 2 and a determination of a position of the portable user identification device 4 by means of the movement sensor 4.1 is started and processed on a regular basis. The movement sensor 4.1 determines a spatial position of the portable user identification device 4. The departing of the portable user identification device 4 from the vehicle 2 takes place to a point of time $t_n=t_l$. Following this initial determination of a position of the portable user identification device 4 to the point of time $t_n=t_l$ a position of the portable user identification device 4 is determined by the movement sensor 4.1 on a regular basis to a point of time $t_n$. The position determined to a certain point of time $t_n$ is a position of the portable user identification device 4 relative to the initial position of the portable user identification device 4 determined to the point of time $t_n=t_l$. For example, the position of the portable user identification device 4 to a point of time $t_n$ is determined by means of vector addition.

The current position of the portable user identification device 4 to a certain point of time $t_n$ is stored in the memory 4.2. A position of the portable user identification device 4 stored before is written over by the current position of the portable user identification device 4. Thus, the current position of the portable user identification device 4 stored in the memory 4.2 is always a relative position of the portable user identification device 4 to the position of the portable user identification device 4 to the point of time $t_n=t_l$, to which the portable user identification device 4 is departing from the vehicle 2.

After deboarding from the vehicle 2, the user carrying the portable user identification device 4 walks a certain path away from the vehicle 2, for example, to do some shopping. After a while, the user walks again back to the vehicle 2 for boarding the vehicle 2 and to drive away. This path walked by the user is symbolized in FIG. 1 by a number of dots 8 and arrows 10. Each dot 8 symbolizes a certain position of the portable user identification device 4 carried by the user to a certain point of time $t_n$. Each arrow 10 symbolizes a certain distance and direction the portable user identification device 4 has been carried by the user. For example, at the point of time $t_n=t_l$ the movement sensor 4.1 of the portable user identification device 4 starts to determine a position of the portable user identification device 4 relative to a position of the portable user identification device 4 to the point of time $t_n=t_l$. Thus, the position of the portable user identification device 4 is equal to the position of the vehicle 2 at $t_n=t_l$.

While the user walks away from the vehicle 2 carrying the portable user identification device 4, the portable user identification device 4 reaches a position, which is characterized by the arrow 10 starting at the vehicle 2 and ending at the dot 8 correlating to this arrow 10, namely to the head of this arrow 10. At the point of time, the portable user identification device 4 has reached the aforementioned dot 8, the position of the portable user identification device 4 at this point of time relative to the position of the portable user identification device 4 to the point of time $t_n=t_l$ is determined by the movement sensor 4.1 and stored in the memory 4.2. Thus, the memory 4.2 contains a position of the portable user identification device 4 to the point of time correlated to the aforementioned dot 8 and relative to the position of the portable user identification device 4 to the point of time $t_n=t_l$.

The user walks further on with the portable user identification device 4, thus the portable user identification device 4 is moving further on along a path displayed by the arrow 10, starting at the aforementioned dot 8 to a point of time directly following the aforementioned dot 8 and ending at the dot 8 correlating to this arrow 10, namely to the head of this arrow 10. The determination and the recording of the position of the portable user identification device 4 by using the movement sensor 4.1 goes on until a point of time $t_n=t_m$ has been reached.

At the point of time $t_n=t_m$ the portable user identification device 4 is arriving at the vehicle 2 again. The position of the portable user identification device 4 corresponding to the point of time $t_n=t_m$ is displayed in FIG. 1 by the schematic drawing of the portable user identification device 4 and with a certain distance to the vehicle 2 in order to support the explanations given to the embodiment shown by FIG. 1. In reality, the user carrying the portable user identification device 4 touches a door handle 2.3.1 of a door 2.3 of the vehicle 2. The vehicle 2 comprises five doors 2.3 in total, each with a door handle 2.3.1. In each of the door handles 2.3.1 of the vehicle 2 a touch-sensitive sensor is integrated. The touch-sensitive sensors are not displayed. By touching one of the door handles 2.3.1 of the doors 2.3 the user initiates a transmission of the identifying signal 6 by the transmitter 4.3 of the portable user identification device 4 to the receiver 2.2.1 of the user identification unit 2.2 of the vehicle 2. The identifying signal 6 correlates to the position of the portable user identification device 4 to the point of time $t_n=t_m$, to which the portable user identification device 4 is arriving at the vehicle 2 again. The vehicle 2 did not move in a period of time beginning with $t_n=t_l$ and ending with $t_n=t_m$.

The controller 2.2.2 of the user identification unit 2.2 of the vehicle 2 evaluates the identifying signal 6 sent by the transmitter 4.3 and received by the receiver 2.2.1. Because of the fact, that the position of the portable user identification device 4 at the point of time $t_n=t_m$, determined by the movement sensor 4.1, stored in the memory 4.2 and sent via the transmitter 4.3 is substantially equal to the position of the vehicle 2 at the point of time $t_n=t_m$, the controller 2.2.2 of the user identification unit 2.2 is driving the component 2.1; thus, the central locking system 2.1 of the vehicle 2 is unlocking the doors 2.3. For example, the position of the vehicle 2 can be determined by a vehicle sensor of the vehicle 2 or any other useful and applicable type of determining a position of the vehicle 2. The position determined as mentioned before can be stored in a memory of the user identification unit 2.2 of the vehicle 2 in order to evaluate the identifying signal 6 of the user identification device 4.

In order to design a more flexible system according to the invention, the component of the vehicle will be driven by the controller, if the identifying signal correlates with a position, which is within a certain area around the position of the vehicle defined beforehand. For example, the certain area defined beforehand could be two meters around the vehicle in order to compensate for the case, if the user does approach a vehicle door 2.3 at the point of time $t_n=t_m$ not equal to the vehicle door 2.3 the user was deboarding the vehicle 2 at the point of time $t_n=t_l$.

The invention is not limited to the exemplary embodiments of the inventive system and the inventive method discussed above. The portable user identification device could not only be designed as a key fob, but could be of any useful and applicable type. For example, the portable user identification device could be a smartphone or something similar. The same is true for the movement sensor, which can be of any useful and applicable type, material, dimension and arrangement. Of course, the component of the vehicle driven by the controller is not limited to be a central locking system but could be of any useful and applicable type, too.

For example, the user identification unit could comprise at least one vehicle sensor for determining an alteration of a position of the vehicle during a period of time starting with the point of time $t_n=t_l$ the portable user identification device is departing from the vehicle until the point of time $t_n=t_m$ the portable user identification device is arriving at the vehicle again, whereat the evaluation of the identifying signal by the controller is executed according to the alteration of the position of the vehicle. That way, it is possible to compensate for a certain movement of the vehicle during the aforementioned period of time, the portable user identification device has left the vehicle. For example, such a situation could occur, if more than one users with more than only one portable user identification devices are using the vehicle. Therefore, the invention allows for its application in such situations, too. The vehicle sensor could be of any useful and applicable type, material, dimension and arrangement. For instance, the vehicle sensor could be a GNSS sensor in order to use a global navigation satellite system. The vehicle sensor could also be a movement sensor of a portable device which is linked in a signal transmitting manner to the user identification unit of the vehicle.

Furthermore, the point of time $t_n=t_l$ to which the portable user identification device is departing from the vehicle, could be stored in the memory of the portable user identification device and the controller of the user identification unit of the vehicle, whereat the evaluation of the identifying signal by the controller could be executed according to the point of time $t_n=t_l$ stored. Hereby, the level of security against relay station attacks or other attacks is further increased.

In other embodiments, an operation of the movement sensor of the portable user identification device could be started and/or stopped according to an amount of energy available to the portable user identification device to operate the portable user identification device in a low power mode. That way, basic functions of the portable user identification device are not affected by a movement sensor of the invention. For example, the movement sensor could be deactivated after a certain amount of time. Thus, after deactivating the movement sensor, the portable user identification device is used like a usual key fob. For instance, in order to unlock a central locking system a user would have to press a button of the key fob.

The invention relates also to a computer program product, comprising instructions to cause the inventive system, for example, the system according to the explained embodiment, to execute the steps of the inventive method, for example, the method according to the explained embodiment, and a computer-readable medium having stored thereon such a computer program product.

The signal transmissions between the portable user identification device and the user identification unit of the vehicle as well as a signal transmission between exterior devices and the user identification unit for determining the position of the vehicle at a certain point of time could be secured by using cryptographic techniques.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method of driving a component of a vehicle via a portable user identification device for the vehicle and a user identification unit of the vehicle, the portable user identification device comprising a movement sensor, a memory and a transmitter, and the user identification unit of the vehicle comprising a receiver and a controller, the method comprising:
    evaluating, via the controller, an identifying signal sent by the transmitter of the portable user identification device to the receiver of the user identification unit;
    driving, via the controller, the component of the vehicle based on the evaluation of the identifying signal; and
    determining and storing in the memory on a regular basis, via the movement sensor of the portable user identification device, a position of the portable user identification device at a point in time tn relative to a position of the portable user identification device at a point of time $tn=tl$, wherein the point of time $tn=tl$ is when the portable user identification device is departing from the vehicle, and
    wherein a position of the portable user identification device at a point of time $tn=tm$, to which the portable user identification device is arriving at the vehicle again, is transmitted as the identifying signal by the transmitter of the portable user identification device to the receiver of the user identification unit of the vehicle.

2. The method according to claim 1, wherein the component of the vehicle is driven by the controller if the identifying signal substantially correlates to a position of the vehicle at the point of time $tn=tm$.

3. The method according to claim 2, wherein the component of the vehicle is driven by the controller if the identifying signal correlates with a position which is within a certain area around the position of the vehicle at the point of time $tn=tm$.

4. The method according to claim 1, wherein the user identification unit comprises at least one vehicle sensor for determining an alteration of a position of the vehicle during a period of time starting with the point of time $tn=tl$ when the portable user identification device is departing from the vehicle until the point of time $tn=tm$ when the portable user identification device is arriving at the vehicle again, and wherein the evaluation of the identifying signal by the controller is executed according to the alteration of the position of the vehicle.

5. The method according to claim 1, wherein the point of time $tn=tl$, to which the portable user identification device is departing from the vehicle, is stored in the memory of the portable user identification device and the controller of the user identification unit of the vehicle, and wherein the evaluation of the identifying signal by the controller is executed according to the point of time $tn=tl$ stored.

6. The method according to claim 1, wherein an operation of the movement sensor of the portable user identification device is started and/or stopped according to an amount of energy available to the portable user identification device to operate the portable user identification device in a lower power mode.

7. A system for driving a component of a vehicle, the system comprising:
    a portable user identification device for the vehicle; and
    an user identification unit of the vehicle,
    wherein the portable user identification device comprises a movement sensor, a memory and a transmitter,
    wherein the user identification unit of the vehicle comprises a receiver and a controller, the controller being adapted such that an identifying signal sent by the transmitter of the portable user identification device to the receiver of the user identification unit is evaluated by the controller and the component of the vehicle is driven by the controller according to the evaluation of the identifying signal,
    wherein the system is adapted such that, on a regular basis and via the movement sensor of the portable user identification device, a position of the portable user identification device at a point of time tn relative to a position of the portable user identification device at a point of time $tn=tl$ is determined and stored in the memory, wherein the point of time $tn=tl$ is when the portable user identification device is departing from the vehicle, and
    wherein a position of the portable user identification device at a point of time $tn=tm$, to which the portable user identification device is arriving at the vehicle again, is transmitted as the identifying signal by the transmitter of the portable user identification device to the receiver of the user identification unit of the vehicle.

8. The system according to claim 7, wherein the user identification unit comprises at least one vehicle sensor for determining an alteration of a position of the vehicle during a period of time starting with the point of time $tn=tl$ when the portable user identification device is departing from the vehicle until the point of time $tn=tm$ when the portable user identification device is arriving at the vehicle again, and wherein the evaluation of the identifying signal by the controller is executed according to the alteration of the position of the vehicle.

9. The system according to claim 7, wherein the movement sensor is a 9-axes-sensor.

10. A non-transitory computer-readable medium having stored thereon a computer program that, when executed by a system, causes the system to carry out the method of claim 1.

* * * * *